United States Patent
Zaagman

(10) Patent No.: US 8,720,931 B2
(45) Date of Patent: May 13, 2014

(54) TILT LIMITING ASSEMBLY FOR FIFTH WHEEL HITCH ASSEMBLY

(71) Applicant: SAF-HOLLAND, Inc., Holland, MI (US)

(72) Inventor: David Zaagman, Holland, MI (US)

(73) Assignee: SAF-HOLLAND, Inc., Holland, MI (US)

(*) Notice: Subject to any disclaimer, the term of this patent is extended or adjusted under 35 U.S.C. 154(b) by 0 days.

(21) Appl. No.: 13/665,220

(22) Filed: Oct. 31, 2012

(65) Prior Publication Data

US 2013/0106076 A1 May 2, 2013

Related U.S. Application Data

(60) Provisional application No. 61/554,726, filed on Nov. 2, 2011.

(51) Int. Cl.
*B62D 53/08* (2006.01)

(52) U.S. Cl.
USPC ........................... 280/438.1; 280/407

(58) Field of Classification Search
USPC ................. 280/438.1, 407, 433, 441
See application file for complete search history.

(56) References Cited

U.S. PATENT DOCUMENTS

| | | | | |
|---|---|---|---|---|
| 2,602,674 A | * | 7/1952 | Harris | 280/438.1 |
| 2,681,236 A | * | 6/1954 | Apgar | 280/440 |
| 3,893,710 A | * | 7/1975 | Madura | 280/407 |
| 5,765,849 A | * | 6/1998 | Moulton et al. | 280/433 |
| 6,488,305 B2 | * | 12/2002 | Laarman | 280/438.1 |
| 6,726,179 B2 | * | 4/2004 | Ketchapaw et al. | 280/441 |
| 8,342,557 B2 | * | 1/2013 | Sibley et al. | 280/438.1 |
| 8,342,558 B1 | * | 1/2013 | Su | 280/438.1 |
| 8,573,627 B2 | * | 11/2013 | Appel | 280/441 |
| 2007/0007747 A1 | * | 1/2007 | Laarman | 280/438.1 |

* cited by examiner

*Primary Examiner* — Ruth Ilan
*Assistant Examiner* — Daniel Yeagley
(74) *Attorney, Agent, or Firm* — Price Heneveld LLP

(57) ABSTRACT

A fifth wheel hitch plate support assembly includes a rack member adapted to be mounted to a vehicle frame member, a mounting member slidably engaging the rack member and selectively repositionable along a length of the rack member, wherein the mounting member is adapted to pivotably support a fifth wheel hitch plate therefrom, a bracket member separated from the mounting member and slidably engaging the rack member, and a stop assembly operably supported by the bracket member and adapted to abut the fifth wheel hitch plate to limit a pivoting movement of the fifth wheel hitch plate with respect to the mounting member.

10 Claims, 8 Drawing Sheets

TILT LIMITING ASSEMBLY FOR FIFTH WHEEL HITCH ASSEMBLY

BACKGROUND OF THE INVENTION

The present invention relates to fifth wheel coupler assemblies, and in particular to a tilt limiting assembly for selectively limiting the tilt of a fifth wheel hitch plate of a fifth wheel hitch assembly with respect to an underlying and supporting vehicle frame.

BRIEF SUMMARY OF THE INVENTION

One aspect of the present invention is to provide a fifth wheel hitch plate support assembly that includes at least one rack member adapted to be mounted to at least one vehicle frame member, and at least one mounting member slidably engaging the at least one rack member and selectively positionable along a length of the at least one rack member, wherein the at least one mounting member is adapted to pivotably support a fifth wheel hitch plate therefrom. The fifth wheel hitch plate support assembly further includes at least one bracket member separated from the at least one mounting member and slidably engaging the at least one rack member, and a stop assembly operably supported by the at least one bracket member and adapted to abut the fifth wheel hitch plate to limit a pivoting movement of the fifth wheel hitch plate with respect to the at least one mounting member.

Another aspect of the present invention is to provide a fifth wheel hitch plate assembly that includes a first rack member and a second rack member each adapted to be mounted to a vehicle frame, a first mounting member slidably engaging the first rack member and selectively positionable along a length of the first rack member, a second mounting member slidably engaging the second rack member and selectively positionable along a length of the second rack member, and a fifth wheel hitch plate pivotably coupled to the first and second mounting members. The fifth wheel hitch plate assembly further includes a first bracket member separated from the first and second mounting members and slidably engaging the first rack member, a second bracket member separated from the first and second mounting members and slidably engaging the second rack member, and a stop assembly including a pivot bar extending between and pivotally coupled with the first and second bracket members between a first position, wherein an at least one abutment member of the stop assembly abuts the fifth wheel hitch plate limiting the pivot of the fifth wheel hitch plate with respect to the first and second mounting members, and a second position, wherein the at least one abutment member does not limit the pivot of the fifth wheel hitch plate with respect to the first and second mounting members.

The present inventive tilt limiting assembly for a fifth wheel hitch assembly provides an uncomplicated design that can be assembled and operated by even relatively unskilled personnel, is efficient in use, may be retrofitted to vehicles currently employing slide-type fifth wheel support assemblies, is capable of a long operating life, and is particularly well adapted for the proposed use.

These and other advantages of the invention will be further understood and appreciated by those skilled in the art by reference to the written specification, claims, and appended drawings.

DETAILED DESCRIPTION OF THE PREFERRED EMBODIMENTS

Figure 1:
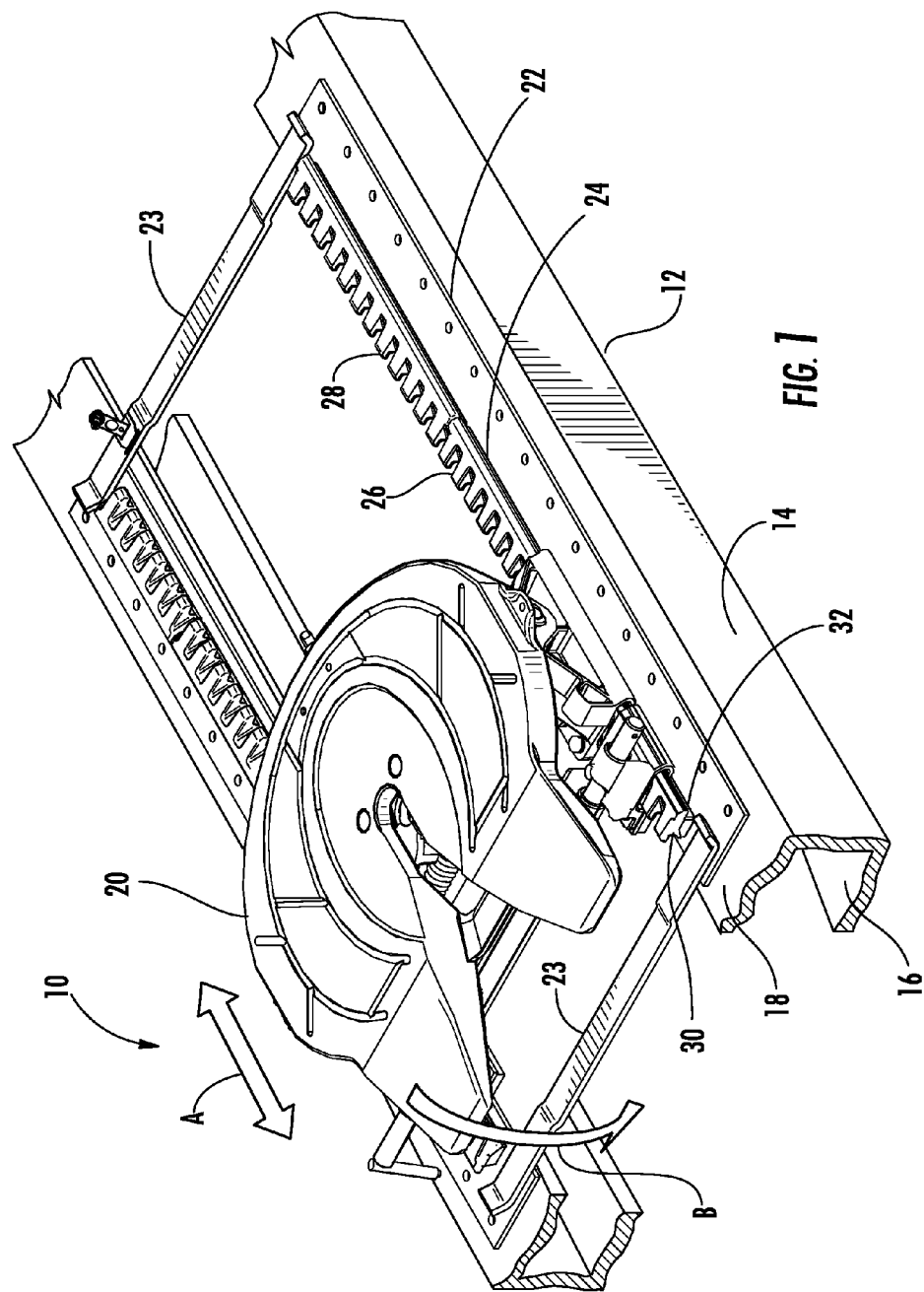
FIG. 1 is a perspective view of a fifth wheel support assembly embodying the present invention, and supported on a pair of vehicle frame rails.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

Figure 2:
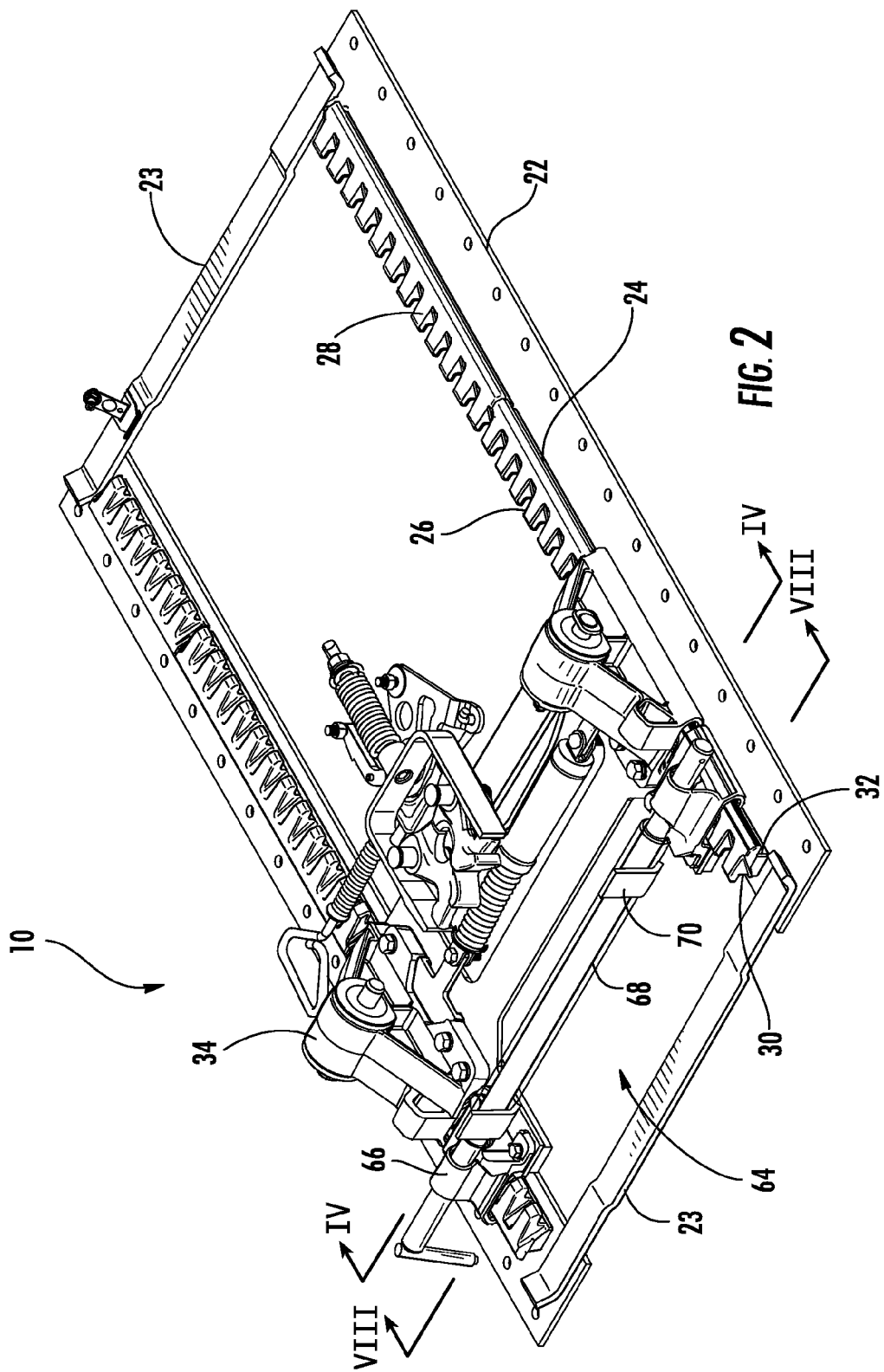
FIG. 2 is a perspective view of the fifth wheel hitch support assembly with a fifth wheel hitch plate removed.

The reference number 10 (FIGS. 1 and 2) generally designates a fifth wheel support slider assembly embodying the present invention. In the illustrated example, the fifth wheel slider assembly 10 is supported by a pair of vehicle frame rails 12 each having C-shaped cross-sectional configurations including a vertical portion 14, a bottom horizontal portion 16, and a top horizontal portion 18. The slider assembly 10 supports a fifth wheel hitch plate 20 above the vehicle frame rails 12 such that the fifth wheel hitch plate 20 is slidably repositionable with respect to the frame rails 12 in a direction A.

The slider assembly 10 includes a pair of mounting plates 22 extending longitudinally along the corresponding vehicle frame rails 12 and a pair of cross-supports 23 extending between and fixedly coupled with paired ends of the mounting plates 23. A pair of rack members 24 are weldably secured to an upper surface of the corresponding mounting plates 22. Each rack member 24 includes a plurality of notches 26 spaced incrementally along the length thereof, and are provided with a T-shaped cross-sectional configuration having a top surface 28, an inwardly facing side surface 30 and an outwardly facing side surface 32.

Figure 3:
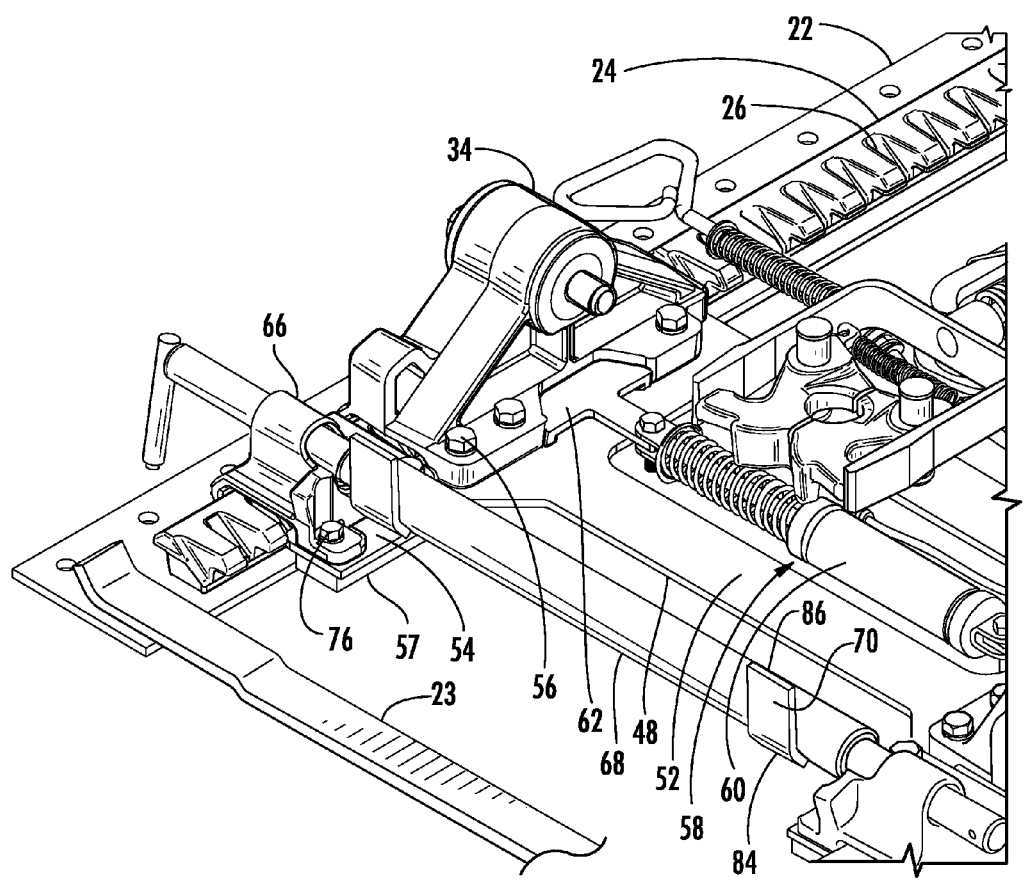
FIG. 3 is an enlarged perspective view of a portion of the fifth wheel hitch support assembly.
Figure 4:
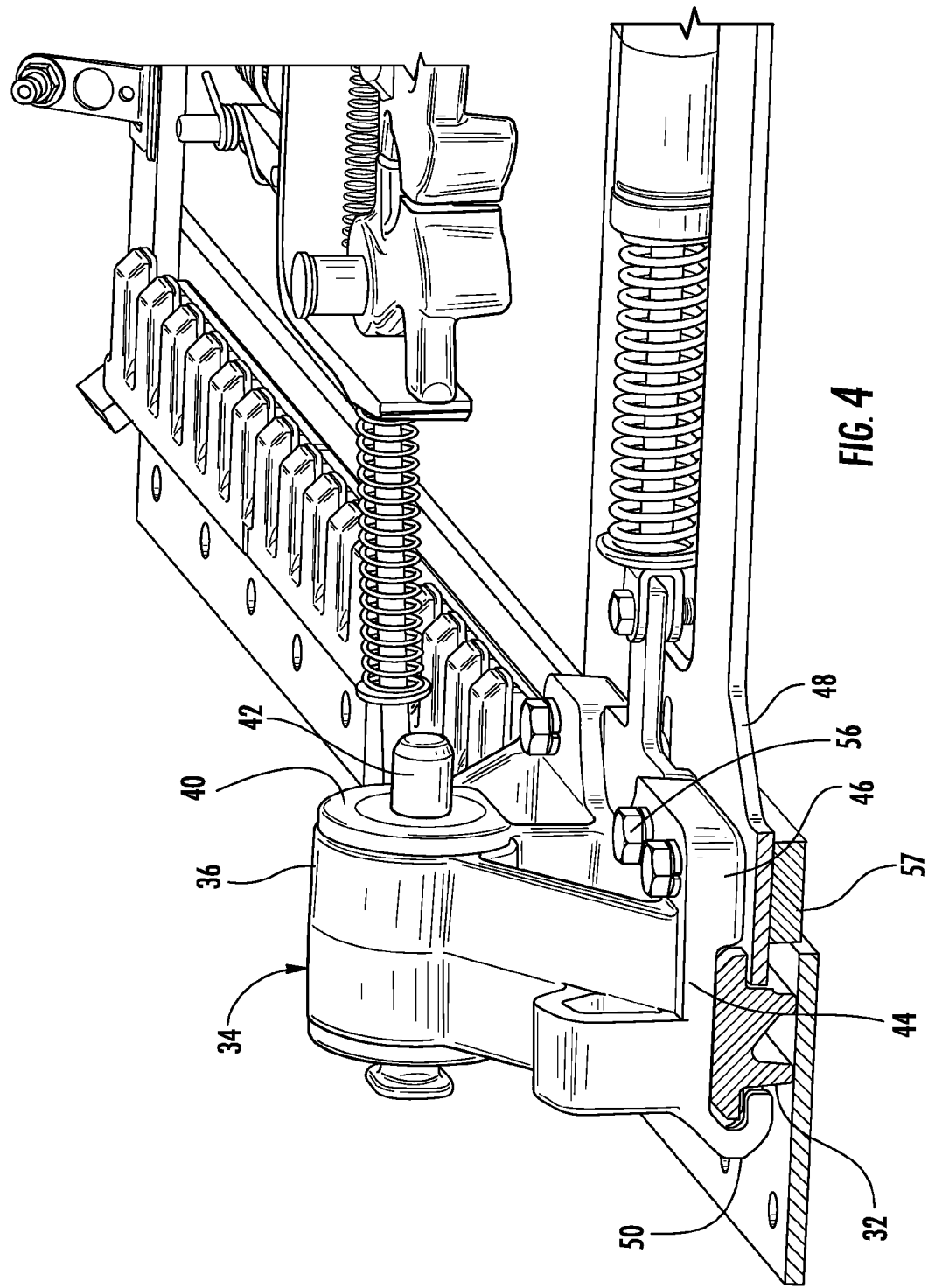
FIG. 4 is cross-sectional perspective view of the fifth wheel support assembly with the fifth wheel hitch plate removed and the cross-section taken along the line IV-IV, FIG. 2.
Figure 5:
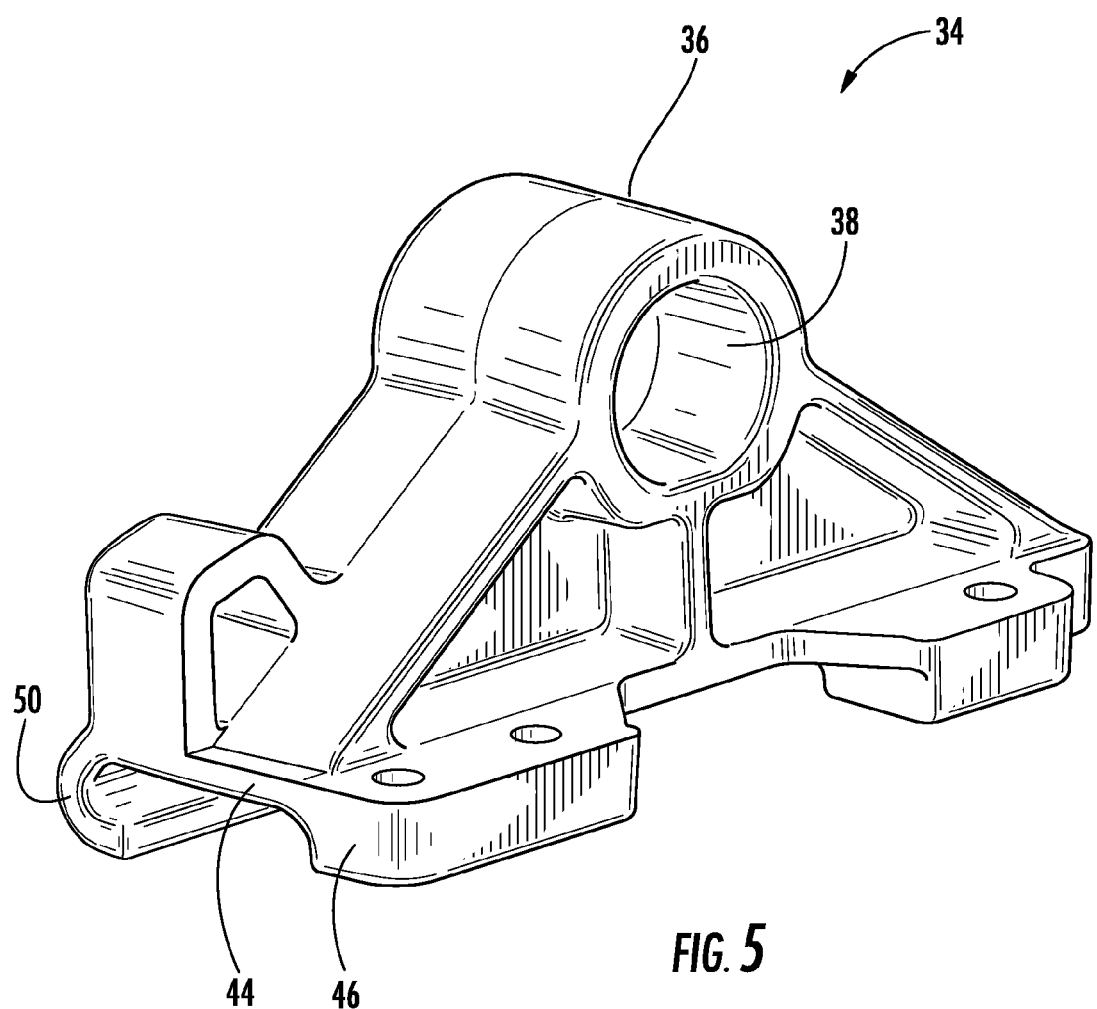
FIG. 5 is a perspective view of a mounting member.

The slider assembly 10 further includes a pair of support brackets 34 (FIG. 3) slidably engaging and extending upwardly from a respective rack member 24. As best illustrated in FIGS. 4 and 5, each support bracket 34 includes a bushing housing 36 having a bushing aperture 38 extending therethrough and receiving a bushing 40 and pivot pin therein for pivotally supporting the fifth wheel hitch plate 20 from the support brackets 34 such that the fifth wheel hitch plate may be pivoted in a direction B. Each support bracket 34 also includes a base plate portion 44 having an inwardly extending coupler portion 46 adapted to couple to a cross member 48, as described below, and an outwardly extending guide portion 50. The guide portion 50 includes a downwardly extending and inwardly opening, C-shaped cross-sectional configuration that guides along the outwardly facing side surface 32 of the respective rack member 24.

Figure 6:
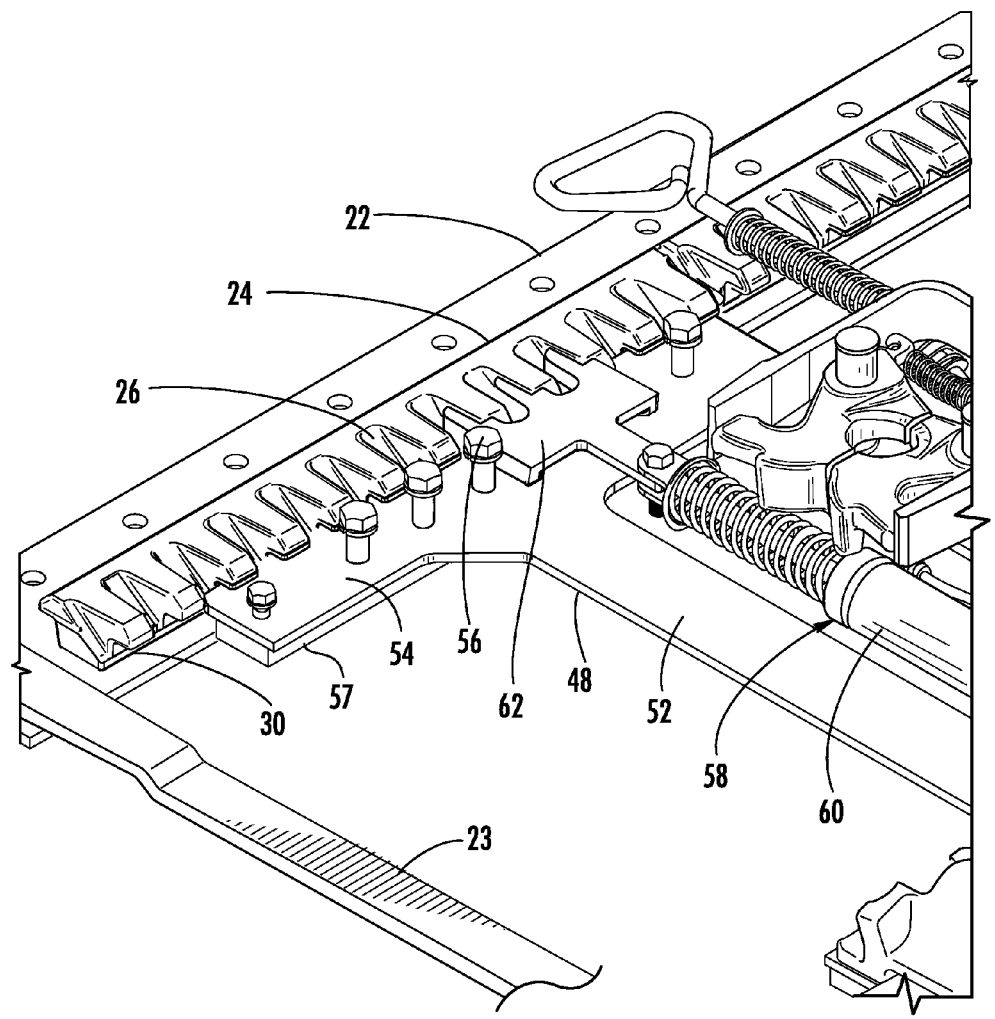
FIG. 6 is an enlarged perspective view of the fifth wheel support assembly with a tilt limiting assembly and a mounting member removed therefrom.

As best illustrated in FIG. 6, the cross member 48 extends between and slidably abuts the inward facing side surface 30 of each of the rack members 24. The cross member 48 includes a central portion 52 and a pair of end portions 54 to which the support brackets 34 are secured via a plurality of bolts 56. Structural reinforcement bars 57 extend across and are secured to a bottom surface of each of the end portions 54. An engagement assembly 58 includes a pneumatic cylinder 60 for selectively moving a pair of engagement members 62 between an unengaged position, wherein the engagement members are disengaged from the notches 26 and the fifth wheel hitch plate 20 may be repositioned with respect to the vehicle frame rails 12, and an engaged or locked position, wherein the engagement members 62 engage the notches 26 of the respective rack members 24, thereby preventing sliding movement of the fifth wheel hitch plate with respect to the vehicle frame rails.

Figure 7:
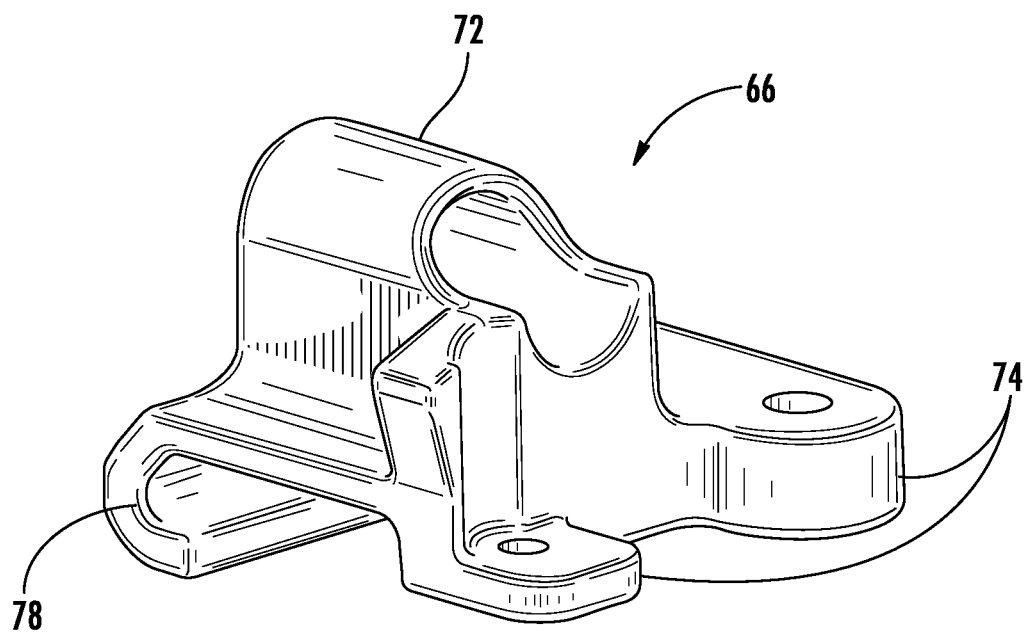
FIG. 7 is a perspective view of a mounting bracket.
Figure 8:
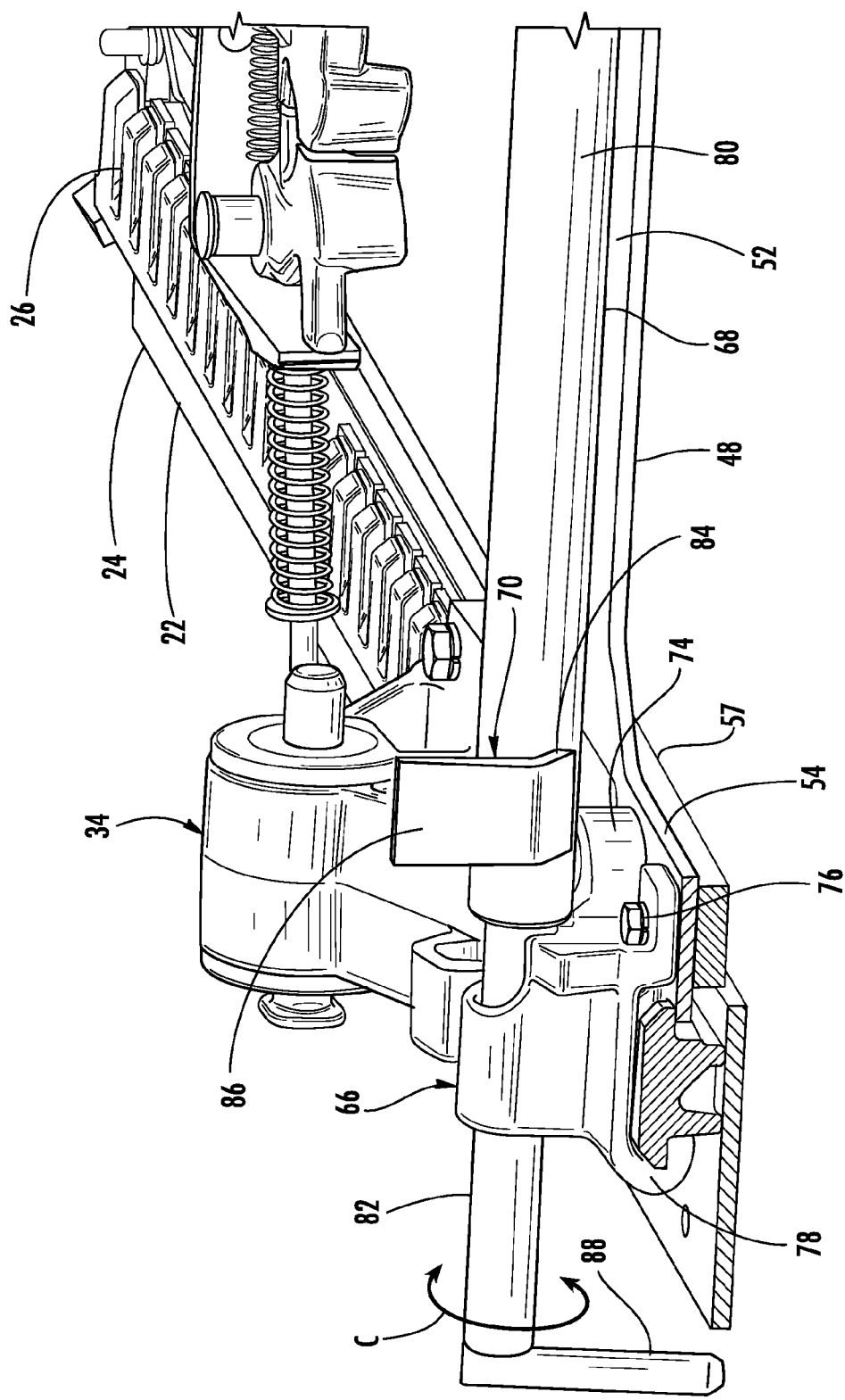
FIG. 8 is a cross-sectional view of the fifth wheel support assembly along the line VIII-VIII, FIG. 2.

The slider assembly 10 further includes a tilt limiting assembly 64 (FIG. 2) for limiting the tilting of the fifth wheel hitch plate 20 with respect to the vehicle frame rails 12 in the direction B. The tilt limiting assembly 64 includes a pair of bracket members 66 that slidably engage respective rack members 24, a pivot bar 68 extending between and pivotally coupled with the bracket member 66, and a pair of abutment or stop members 70 adapted to selectively abut an underside of the fifth wheel hitch plate 20, thereby preventing the fifth wheel hitch plate 20 from being moved in the direction B. As best illustrated in FIGS. 7 and 8, each bracket member 66 includes a bearing portion 72 that rotatably receives an end of the pivot bar 60 therein, a mounting portion 74 that is secured to an end portion 54 of the cross member 48 via a plurality of mechanical fasteners such as bolts 76, and an outwardly and downwardly extending, inwardly opening, C-shaped guide portion 78 that abuts and guides along the outwardly facing side surface 32 of the respective rack member 24. The pivot bar 68 includes a central portion 80 and end portions 82 each having a diameter that is less than the diameter of the central portion 80 and which are received within the bearing portion 72 of the respective bracket members 66. Each abutment member 70 includes a distal end 84 fixedly secured to the central portion 80 of the pivot bar 68, via welding or the like, and a proximal end 86 adapted to selectively abut an underside of the fifth wheel hitch plate 20. A handle 88 is secured to one of the end portions 82 of the pivot bar 68 thereby allowing the operator to rotate the pivot bar 68 in a direction C and move the abutment member 70 between a locked position, wherein the abutment members 70 abut an underside of the fifth wheel hitch plate 20, thereby limiting the amount of travel of the fifth wheel hitch plate 20 in the direction B, and an unlocked position, wherein the end portion 82 of each of the abutment members 70 are pivoted away from an underside of the fifth wheel hitch plate 20, thereby allowing the fifth wheel hitch plate 20 to pivot freely in the direction B.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A fifth wheel hitch plate support assembly, comprising:
at least one rack member adapted to be mounted to at least one vehicle frame member;
at least one mounting member slidably engaging the at least one rack member and selectively positionable along a length of the at least one rack member, wherein the at least one mounting member is adapted to pivotably support a fifth wheel hitch plate therefrom;
at least one bracket member separated from the at least one mounting member and slidably engaging the at least one rack member; and
a stop assembly operably supported by the at least one bracket member and adapted to abut the fifth wheel hitch plate to limit a pivoting movement of the fifth wheel hitch plate with respect to the at least one mounting member.

2. The fifth wheel hitch plate support assembly of claim 1, wherein the stop assembly is movable between an engaged position, wherein the stop assembly limits the pivoting movement of the fifth wheel hitch plate with respect to the at least one mounting member, and a disengaged position, wherein the stop assembly does not limit the pivoting movement of the fifth wheel hitch plate with respect to the at least one mounting member.

3. The fifth wheel hitch plate support assembly of claim 2, wherein the stop assembly includes a pivot bar pivotably coupled with the at least one bracket member.

4. The fifth wheel hitch plate support assembly of claim 3, wherein the stop assembly includes at least one abutment member extending outwardly from the pivot bar and that is selectively abutable with the fifth wheel hitch plate.

5. The fifth wheel hitch plate support assembly of claim 1, wherein the at least one rack member includes a first rack member adapted to be mounted to a first vehicle frame member of the at least one vehicle frame member, and a second rack member adapted to be mounted to a second vehicle frame member of the at least one vehicle frame member, the at least one mounting member includes a first mounting member slidably engaging the first rack member and a second mounting member slidably engaging the second rack member, and wherein the at least one bracket member includes a first bracket member slidably engaging the first rack member and a second bracket member slidably engaging the second rack member.

6. The fifth wheel hitch plate support assembly of claim 1, wherein the stop assembly includes a pivot bar extending between and pivotally coupled with the first and second bracket members.

7. The fifth wheel hitch plate support assembly of claim 6, wherein the stop assembly includes at least one abutment member extending outwardly from the pivot bar and that is selectively abutable with the fifth wheel hitch plate.

8. The fifth wheel hitch plate support assembly of claim 1, wherein at least one rack member includes a top surface, a bottom surface, and inwardly facing abutment side surface, and an outwardly facing abutment side surface, and wherein at least a select one of the at least one mounting member and at least one bracket member engage only a select one of the inwardly facing abutment side surface and the outwardly facing abutment side surface.

9. The fifth wheel hitch plate support assembly of claim 8, wherein the at least one bracket member engages only the outwardly facing abutment surface of the at least rack member.

10. A fifth wheel hitch plate assembly, comprising:
a first rack member and a second rack member each adapted to be mounted to a vehicle frame;
a first mounting member slidably engaging the first rack member and selectively positionable along a length of the first rack member, and a second mounting member slidably engaging the second rack member and selectively positionable along a length of the second rack member;

a fifth wheel hitch plate pivotably coupled to the first and second mounting members;

a first bracket member separated from the first and second mounting members and slidably engaging the first rack member, and a second bracket member separated from the first and second mounting members and slidably engaging the second, rack member;

a stop assembly including a pivot bar extending between and pivotably coupled with the first and second bracket members between a first position, wherein an at least one abutment member of the stop assembly abuts the fifth wheel hitch plate limiting the pivot of the fifth wheel hitch plate with respect to the first and second mounting members, and a second position, wherein the at least one abutment member does not limit the pivot of the fifth wheel hitch plate with respect to the first and second mounting members.

* * * * *